United States Patent [19]

Rogers

[11] Patent Number: 5,051,895
[45] Date of Patent: Sep. 24, 1991

[54] APPARATUS AND METHOD FOR TRACKING AND IDENTIFYING PRINTED CIRCUIT ASSEMBLIES

[75] Inventor: Donald L. Rogers, San Jose, Calif.

[73] Assignee: Hewlett-Packard Company, Palo Alto, Calif.

[21] Appl. No.: 412,542

[22] Filed: Sep. 22, 1989

Related U.S. Application Data

[63] Continuation of Ser. No. 98,595, Sep. 17, 1987, abandoned.

[51] Int. Cl.$^5$ .............................................. G06F 15/16
[52] U.S. Cl. ..................................... 364/200; 364/488; 364/900; 340/825.06
[58] Field of Search ............... 364/488, 200, 900, 132; 340/825.25, 825.50, 825.52, 825.06, 825.07, 825.22

[56] References Cited

U.S. PATENT DOCUMENTS

| | | | |
|---|---|---|---|
| 4,251,858 | 2/1981 | Cambigue et al. | 364/132 |
| 4,442,502 | 4/1984 | Friend et al. | 364/900 |
| 4,562,535 | 12/1985 | Vincent et al. | 364/200 |
| 4,589,063 | 5/1986 | Shah et al. | 364/200 |
| 4,698,766 | 10/1987 | Entwistle et al. | 364/132 |
| 4,700,292 | 10/1987 | Campanini | 364/132 |
| 4,701,878 | 10/1987 | Günkel et al. | 364/900 |
| 4,727,475 | 2/1988 | Kiremidjian | 364/200 |

Primary Examiner—Parshotam S. Lall
Assistant Examiner—V. N. Trans
Attorney, Agent, or Firm—Roland I. Griffin; Alan H. Haggard

[57] ABSTRACT

A method and apparatus for tracking and identifying printed circuit assemblies is presented. Information about each printed circuit assembly (PCA), including the current revision level of the PCA is stored within a non-volatile random access memory (RAM) within each PCA. The stored information may be accessed by a user through a dedicated bus and hardware designed for this task. Additionally, through the dedicated bus and hardware, the user may update the information within the printed circuit assembly.

2 Claims, 5 Drawing Sheets

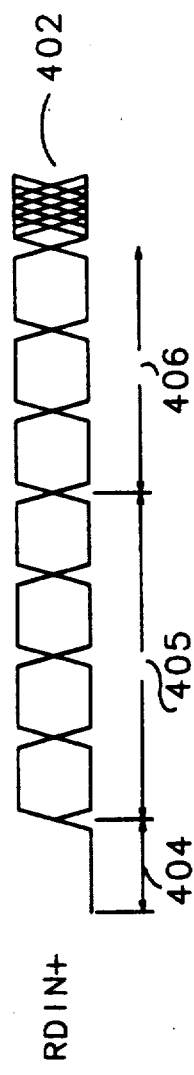
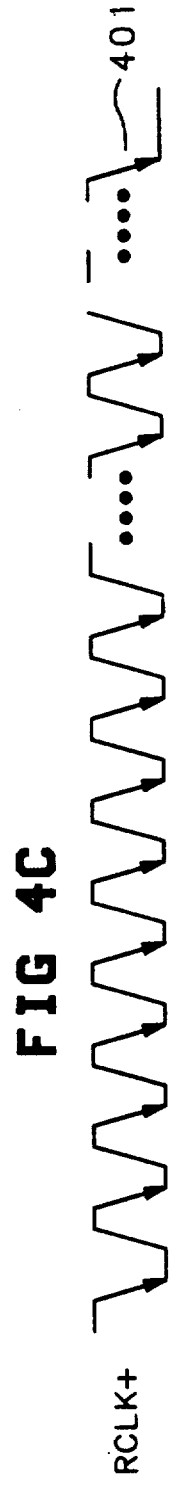
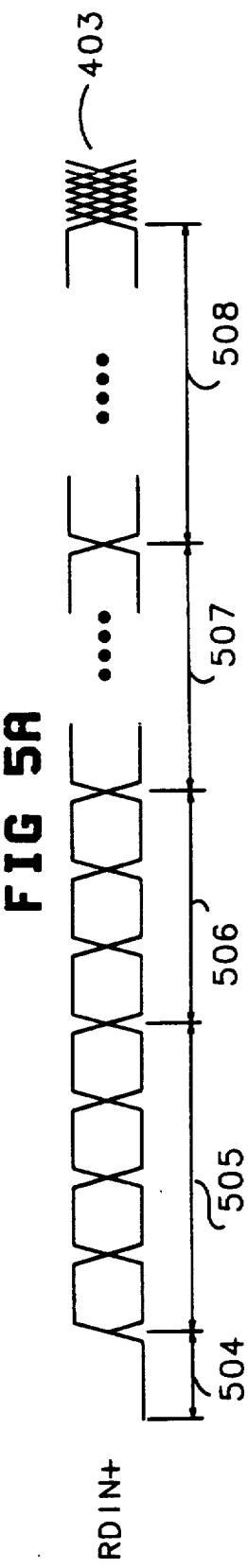

APPARATUS AND METHOD FOR TRACKING AND IDENTIFYING PRINTED CIRCUIT ASSEMBLIES

CROSS REFERENCE TO RELATED APPLICATION

This application is a continuation of application Ser. No. 07/098,595, filed Sept. 17, 1987, now abandoned.

BACKGROUND

In large computer systems, numerous printed circuit assemblies (PCA) are connected together at a computer backplane. Each PCA may be individually modified and updated. This modification is typically not discernable from the appearance of the PCA. Therefore, information is often placed on a label on the PCA.

Often the modification or update of one PCA in a computer system may require modification of one or more PCAs in the computer system in order for the computer system to function properly. Therefore, in order to update one PCA it may be necessary to examine several PCAs in order to determine versions of which PACs are extant in the system. This can be extremely time consuming and inconvenient.

Additional problems arise when PCAs are remotely update. That is, updating certain PCAs may not require the exchanging of hardware but only the replacing of software. The replacement software may be transferred through telephone lines and installed in a PCA without a service representative being required to visit the cite of the computing system. In this case, however, the service representative would be unable to read the labels on other PCAs within the computing system. Further, he would be unable to relabel the updated PCA

SUMMARY OF THE INVENTION

In accordance with the preferred embodiment of the present invention, a method and apparatus for tracking and identifying printed circuit assemblies is presented. Within each printed circuit assembly is a non-volatile random access memory (RAM). Within each RAM is stored information about the printed circuit assembly, including the current revision level of the assembly. This information may be accessed by a user through a dedicated bus and hardware designed for this task. Additionally, through the dedicated bus and hardware, the user may update the information within the printed circuit assembly.

BRIEF DESCRIPTION OF THE DRAWINGS

FIG. 4 and FIG. 5 show various timing diagrams describing data flow to and from the interface shown in FIG. 3.

DESCRIPTION OF THE PREFERRED EMBODIMENT

Figure 1:
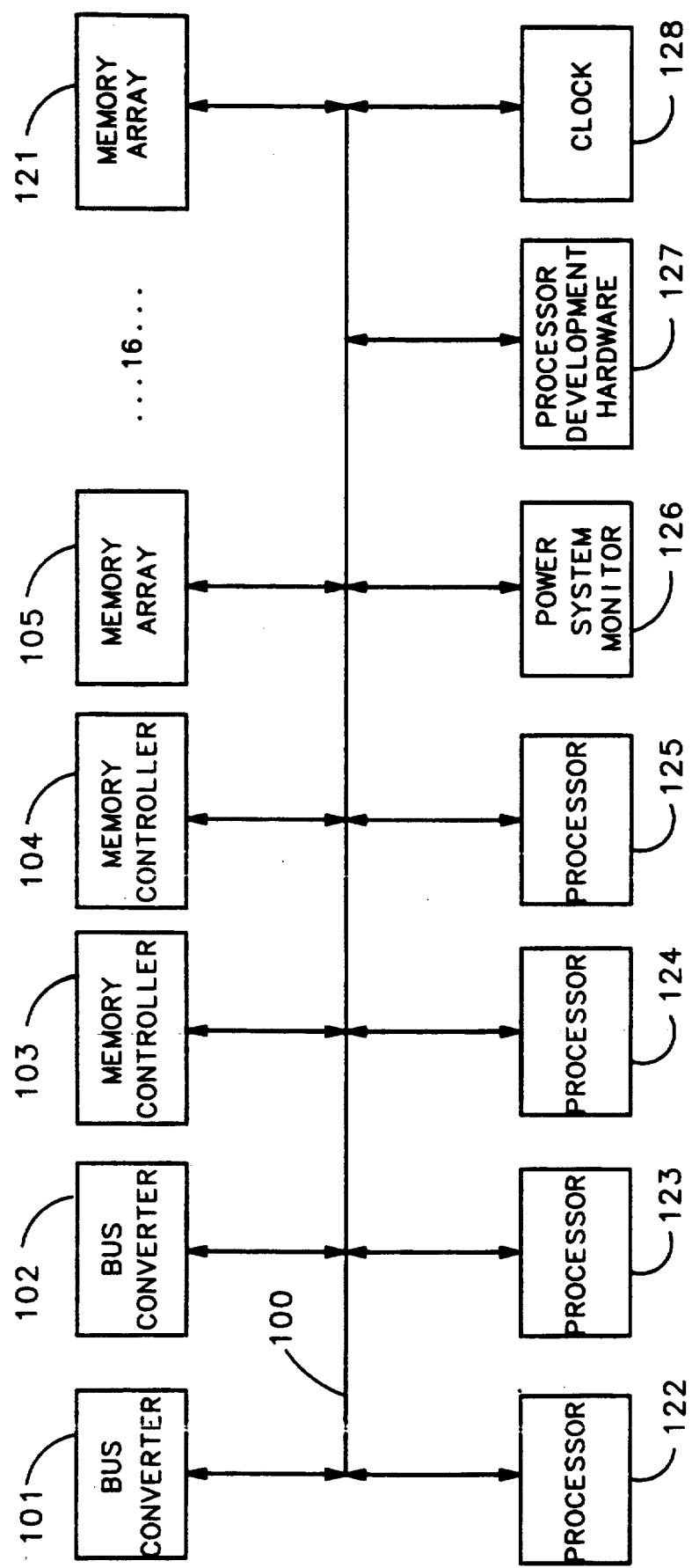
FIG. 1 shows a block diagram of various printed circuit assemblies coupled to each other through a bus in accordance with a preferred embodiment of the present invention.

FIG. 1 shows a bus 100. Bus 100 is wholly dedicated to transfer information describing printed circuit assemblies (PCA). Shown coupled to bus 100 are the following PCAs: a bus converter 101, a bus converter 102, a memory controller 103, a memory controller 104, a memory array 105 and a memory array 106 which are representative of sixteen memory arrays, a processor 122, a processor 123, a processor 124, a processor 125, a power system monitor 126, processor development hardware (PDH) and a clock 128.

Figure 2:
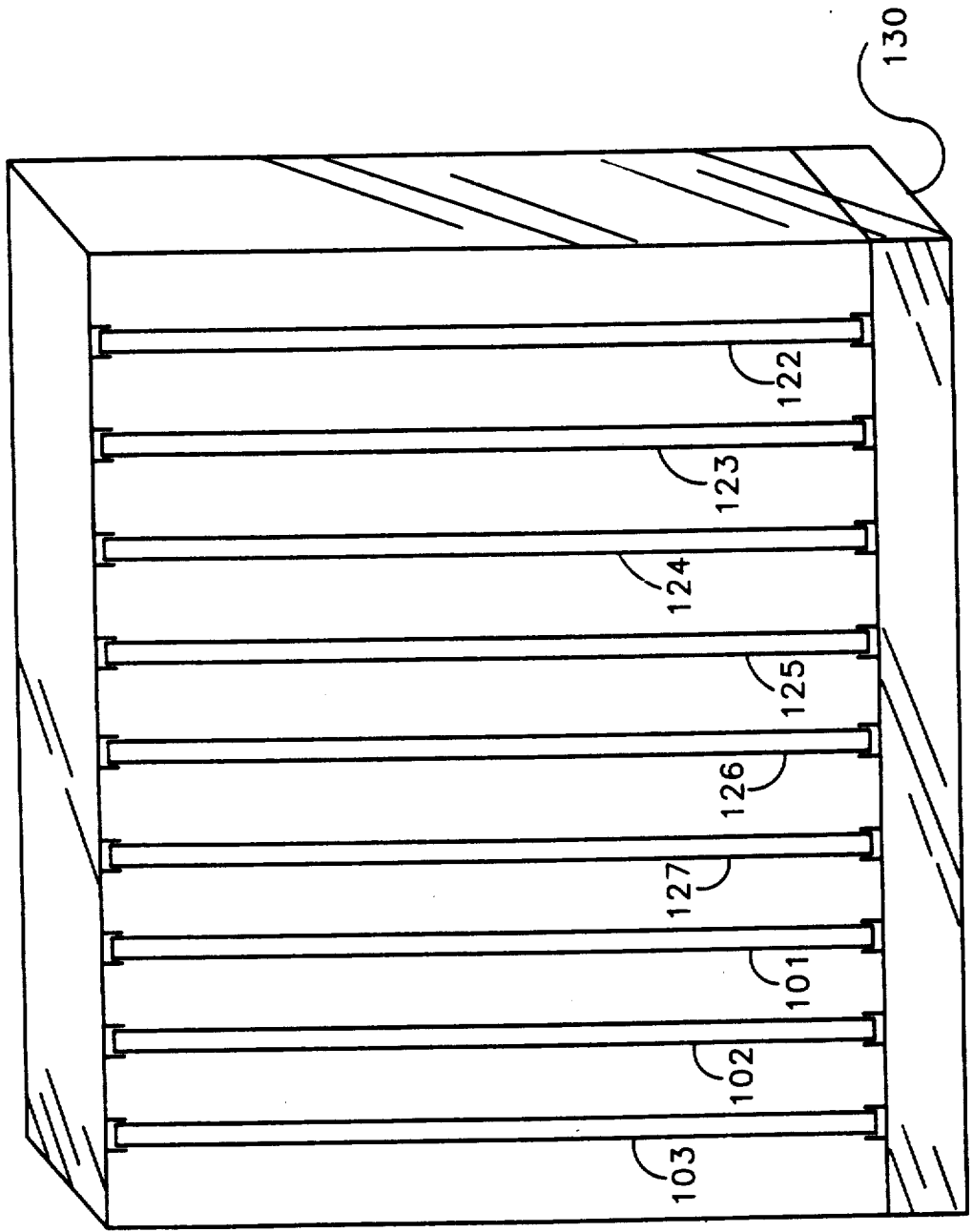
FIG. 2 shows how certain of the printed circuit assemblies in FIG. 2 may be arranged in slots in a cabinet.

Typically the PCAs shown in FIG. 1 will be mounted in a computer cabinet. FIG. 2 shows how processor 122, processor 123, processor 124, processor 125, power system monitor 126, PDH 127, bus converter 101, bus converter 102 and memory controller 103 might be placed within slots in a computer cabinet 130.

Figure 3:
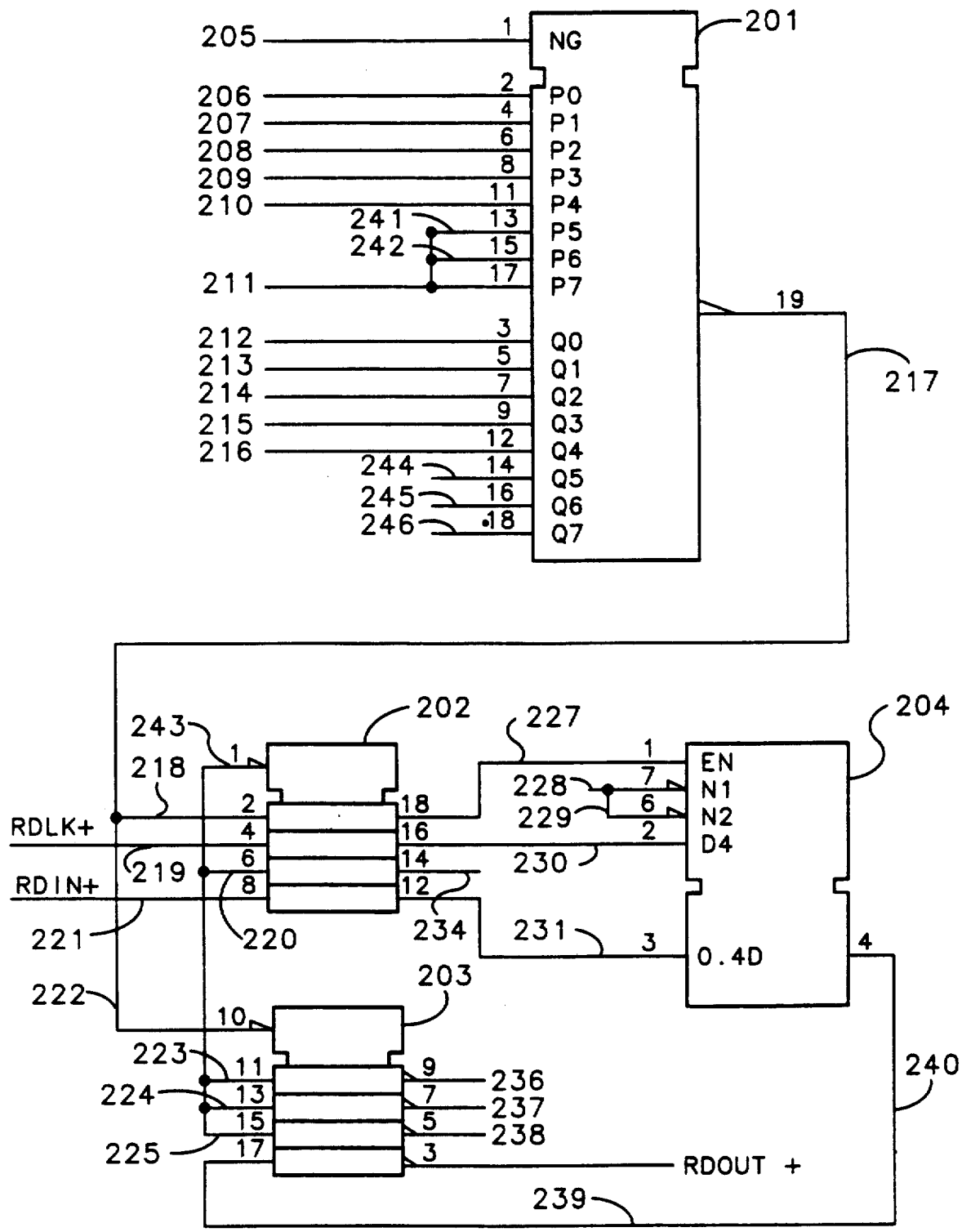
FIG. 3 shows an embodiment of an interface which exists in each printed circuit assembly shown in FIG. 1, which is used to access the bus also shown in FIG. 1.

Each PCA shown in FIG. 1 contains a special interface to bus 100. A block diagram of this special interface is shown in FIG. 3. The interface consists of four chips interconnected as shown. Chips 201, 202 and 203 are manufactured by Texas Instruments Incorporated, P.O. Box 225012, Dallas, Texas 75265. Chip 201 has a part number 75ALS520. Chip 202 and chip 203 have a part number 74ALS240N. A chip 204 is a 16×16 Bit Serial Nonvolatile Static RAM produced by Xicor Inc., and has a part number X2444.

Data bus 100 includes the following lines from the interface of each of the PCAs connected to bus 100: lines 205, 206, 207, 208, 209, 219, 221, and 239. Each of these lines are interconnected to the bus, and thus are interconnected with corresponding lines from interfaces in each of the PCAs connected to bus 100. Lines 241, 242, 211, 228 and 229 are all set at a logic 1. Lines 243, 220, 223, 224 and 225 are all set at logic 0. Lines 244, 245, 246, 234, 236, 237, and 238 are not connected. Lines 212, 213, 214, 215 and 216 give a uniqu five-bit address for each PCA. This unique five-bit address is determined by the slot the PCA is placed in. The unique address allows each PCA to be addressed individually.

Bus 100 is controlled by PDH 127. The following is a description of how PDH 127 interacts with the interface circuit shown in FIG. 3, and thus with the interface circuit in each of the interfaces within PCAs coupled to bus 100.

PDH 127 places a five-bit address on lines 506, 507, 508, 509 and 510. PDH 127 raises line 205 to a logic 1 . . Chip 201 checks to see if the address on lines 506–510 matches the unique five-bit address on lines 512–516. If so, line 205 is activated to logic, 0, enabling chip 203. Chip 202 is always enabled; therefore, chip 202 receives the logic 0 at line 218, inverts the signal, and through line 227 enables chip 204. Once chip 204 is enabled, chip 204 is able to read a clock signal which PDH 127 places on line 219 and a data signal which PDH places on line 221. These signals are inverted by chip 202 and placed on lines 230 and 231 respectively. Additionally, once chip 203 is activated, chip 204 may transmit data to PDH 127 by placing the information on line 240. This information is inverted by chip 203 and placed on line 239, where it is read by PDH 127.

Chip 204 is able to contain 32 bytes of information. In the preferred embodiment the following information is stored by each PCA: an assembly number which indicates the type of board, e.g., memory array, processor, etc.; a date code which indicates what revision of the board currently resides in the PCA; A hardware identification number which is used to define the processor type, a serial number for the board, a division number, which indicates the company division which manufactures the board; boot idenification number, which indicates which board will boot the system; and a software identification number which further defines the processor type. In addition a byte is reserved to store the unique five-bit address of each PCA. In the current embodiment, the Assembly number requires five bytes, so the last byte of address 0010, is reserved for PDH 127. However, this information is not actually stored in chip 204 because the information is already available to PDH 127. The following table lists how the information is arranged in sixteen 16-bit words stored in chip 204.

TABLE 1

| ADDR | INFORMATION STORED |
|------|--------------------|
| 0000 | Assembly Number |
| 0001 | " |
| 0010 | " |
| 0011 | Date Code |
| 0100 | Hardware Indentification Number |
| 0101 | " |
| 0110 | Serial number |
| 0111 | " |
| 1000 | " |
| 1001 | Division Number |
| 1010 | Boot Identification Number |
| 1011 | " |
| 1100 | Software Identification Number |
| 1101 | " |
| 1110 | Unused |
| 1111 | " |

The following explains how chip 204 receives and sends information. More complete information is available from the data sheet for this part.

FIG. 4 is a timing diagram indicating how data may be accessed from chip 204. FIG. 4 shows a clock signal (RCLK+) 401 which is placed on line 219, an input siganl (RDIN+) 402 to chip 204, which is placed on line 221, and a output singal (RDOUT+) 403 which is placed on line 239. As can be seen from FIG. 4, chip 204 sends or receives on bit of information per clock cycle. After being enabled chip 104 looks for a command start bit 404. These are followed by four bits 405 indicating an address within the memory array within chip 204. The address is followed by 3 bits 406 which contain a command. This command may be a "read" or a "write" or a general command which specifies chip 204 to perform some function internally. If the command is a read, as in FIG. 4, data is accessed from chip 204. Immediately upon receiving a command to read chip 204 places a first byte 407 and a second byte 408 on line 240 through chip 203 to line 239. First byte 407 and second byte 408 contain data stored within chip 204 at the address specified by bits 405.

FIG. 5 is a timing diagram indicating how information may be stored by chip 204. FIG. 5 shows clock signal 401 and input signal 402 as they are used to write data into chip 204. After being enabled chip 204 looks for a command start bit 504. These are followed by four bits 505 indicating an address within the memory array within chip 204. The address is followed by 3 bits 506 which contain a command. If the command is a write, as in FIG. 5, data is written to chip 204. Upon receiving a command to write, chip 204 continues to reads a first byte 507 and a second byte 508 on line 240 which are placed on line 221. First byte 507 and second byte 508 contain data to be stored within chip 204 at the address specified by bits 505.

Figure 6:
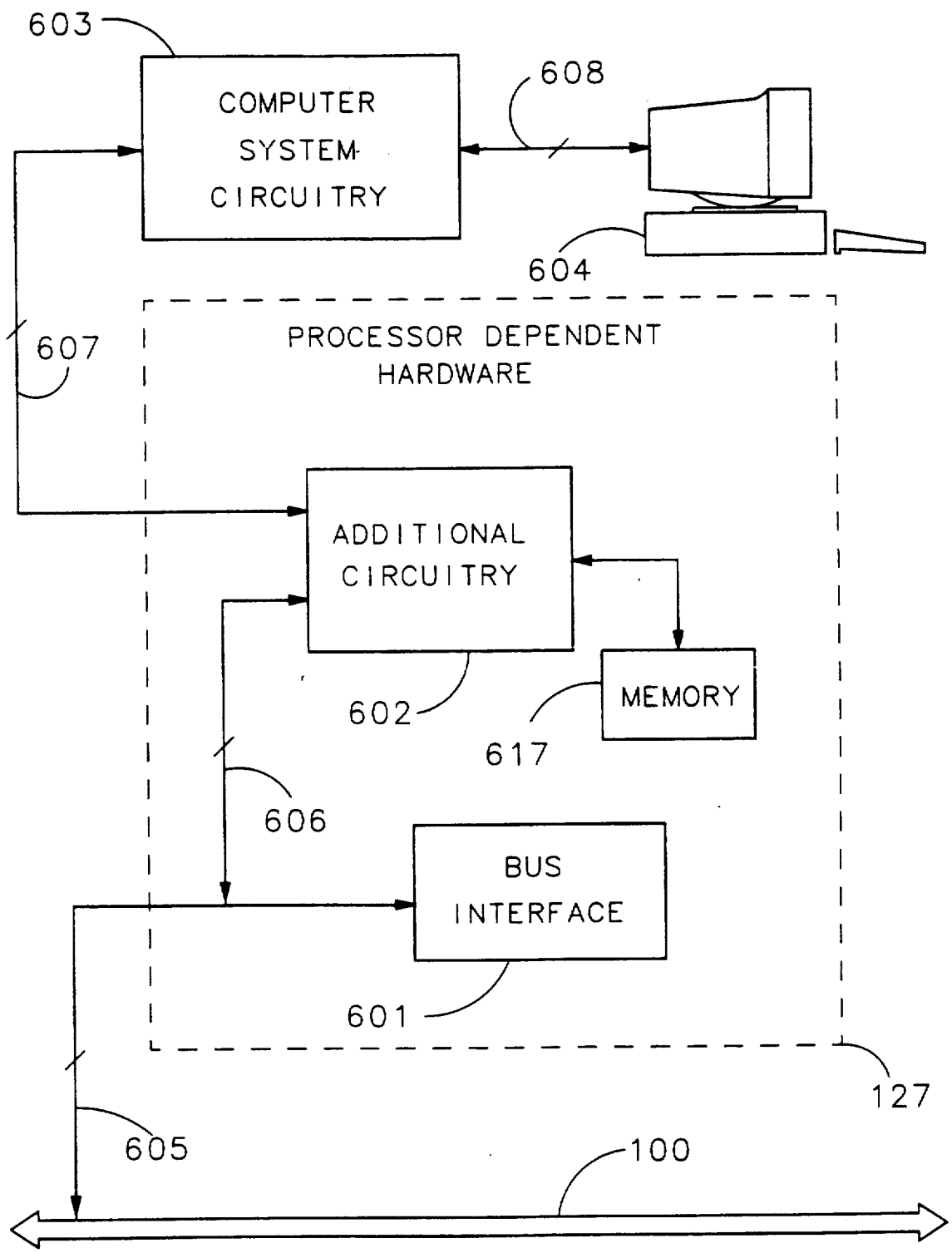
FIG. 6 is a block diagram of processor development hardware in accordance with the preferred embodiment of the present invention.

FIG. 6 shows a block diagram of PDH 127. A bus interface 601 essentially comprises the interface shown in FIG. 3. Bus interface 601 is coupled to bus 100 through lines 605. Additional circuitry 602 is shown coupled to lines 605 through lines 606. It is through lines 606 and their associated drives within additional circuitry 602, that PDH 127 communicates with PCAs connected to bus 100. PDH 127 communicates with computer system circuitry 603 through lines 607. Computer system circuitry 603 may include some or all of the PCAs shown in FIG. 1. Although PDH 127 controls data flow through bus 100, PDH 127 receives instructions from computer system circuitry 603 as to what information PDH 127 should require to be accessed or stored. Ultimately a User (not shown) queries computer system circuitry 603 as to biographical information about PCAs within the computing system. For instance a user may do so by using a terminal 604 coupled to computer system 603 through line 608. Computer system circuitry 603 through lines 607 requests PDH 127 to find this information. PDH through lines 606 requests this information from the PCAs through bus 100.

Since bus 100 is not a high speed bus it may be optimal for PDH 127 to request information from each PCA at start-up time. PDH uses bus 100 to secure the biographical information from each PCA, this information may be stored in a memory 607. When biographical information is requested, PDH 127 may access this information from memory 607, saving the time required to access this inforamtion through bus 100.

I claim:

1. In a computer system which includes a plurality of printed circuit assemblies, an apparatus for allowing the electronic storage and retrieving of service information about each printed circuit assembly facilitating the tracking and identification of the plurality of printed circuit assemblies by service agents, the apparatus comprising:

non-volatile random access memory within each printed circuit assembly, each non-volatile random access memory storing service information about a printed circuit assembly within which the non-volatile random access memory resides; and, retrieval and storage means, coupled to each printed circuit assembly, for electronically retrieving service information from each non-volatile random access memory within a printed circuit assembly and making the service information available to the service agents, and for enabling the service agents to electronically change the service information stored in the non-volatile random access memory without physically accessing the printed circuit assembly, wherein the retrieval and storage means comprises a bus coupled to each printed circuit assembly and wholly dedicated to the electronic storage and assembly of information about each printed circuit assembly, and wherein a first printed circuit assembly from the plurality of printed circuit assemblies controls all.data transactions which occur on the bus.

2. An apparatus as in claim 1 wherein upon booting up the computing system, the first printed circuit assembly secures the service information from each non-volatile random access memory within a printed circuit assembly and stores the information within the first printed circuit assembly whereby the service agents may access the service information quickly.

* * * * *